United States Patent [19]
Sholl et al.

[11] 3,721,267
[45] March 20, 1973

[54] VALVE CONTROL DEVICE

[75] Inventors: Arthur F. Sholl, Omaha; Donald L. Wolfe, Wahoo; Armando R. Benitez, Omaha, all of Nebr.

[73] Assignee: Paxton-Mitchell, Omaha, Nebr.

[22] Filed: Oct. 28, 1971

[21] Appl. No.: 193,277

[52] U.S. Cl. ............137/624.18, 137/624.11, 91/36
[51] Int. Cl. ..............................................F15b 11/04
[58] Field of Search .........137/624.11, 624.18; 91/36

[56] References Cited

UNITED STATES PATENTS

| 2,591,216 | 4/1952 | Thompson | 251/12 X |
| 2,812,920 | 11/1957 | Granberg | 222/76 X |
| 3,048,190 | 8/1962 | Carling | 137/624.11 |
| 3,422,847 | 1/1969 | Polizzi | 137/624.18 |

*Primary Examiner*—Alan Cohan
*Attorney*—J. Robert Henderson et al.

[57] ABSTRACT

A control device operably connected to a pressure compensated flow control valve for controlling the rate of flow of fluid therethrough. The device includes a spring connected to the shaft of the valve to bias it to a normal position, a stop assembly secured to the shaft and having a plurality of stops wherein each stop limits the movement of the shaft to a predetermined amount, a stop control actuator operably connected to the shaft and having a shaft control means connected thereto, wherein the actuator in response to the shaft control means is operable to apply force to the shaft to move it in step relation against the bias of the spring to any predetermined position as established by the position of the stops in step relation.

11 Claims, 5 Drawing Figures

PATENTED MAR 20 1973

INVENTOR.
ARTHUR F. SHOLL
ARMANDO R. BENITEZ
BY  DONALD L. WOLFE

Henderson & Strom

VALVE CONTROL DEVICE

BACKGROUND OF THE INVENTION

This invention relates to control devices for throttle valves in hydraulic systems and particularly to step control devices for rotary valves in hydraulic control systems of cranes.

The acceleration or deceleration of a boom of a crane needs to be limited near the ends of its travel to prevent undesirable oscillation of the load carried by the boom. Control of acceleration in a hydraulic system can be obtained by controlling the fluid flow through a valve that is in the hydraulic lines connected to hydraulic actuators. The valve should be capable of being remotely controlled from different locations.

A valve that can be operated between two positions by remote control is shown in U.S. Pat. No. 2,591,216 issued to R.H. Thompson et al. on Apr. 1, 1952. The valve is a two-way valve, and a cylinder is fluidly connected to each outlet. The fluid flowing from the high-pressure inlet through either outlet operates the rod of the cylinder to a different longitudinal position, and the rod is coupled through a pair of springs to a lever for controlling the valve. A latch restrains the lever until the latch is moved by operation of an electromagnet. The latch and therefore a change in position of the shaft of the valve is controlled from a remote electrical switch.

A remotely controlled valve having an intermediate position is shown in U.S. Pat. No. 2,812,920 issued to A.J. Granberg on Nov. 12, 1957. This valve is used for dispensing liquids in bulk plants rather than for control in hydraulic systems. A notched cam is secured to the shaft of a switch, and followers or locking pins normally bearing against the cams are withdrawn by operation of associated electromagnets. When the valve is to be closed, an intermediate stop on the cam is engaged by a follower to permit reduced flow until an electromagnet is operated to withdraw the follower.

SUMMARY OF THE INVENTION

The rate of flow to a selected hydraulic actuator of a crane is determined by remote control of a pressure compensated flow control valve. A stop assembly is connected to the shaft of the rotary valve to determine the amount that it can be rotated from a normal setting for minimum flow. The stop assembly comprises a pair of horizontal adjacent disks with a plurality of registering corresponding openings, and with a stop ball retained in each opening of the lower disk. The holes in the upper disk are elongated different amounts so that when one of the balls is positioned vertically so that a substantial part of it is in each of its openings, the shaft of the rotary valve can be rotated a different amount from that amount to be obtained when a different ball is positioned in both of its openings.

A solenoid is controlled remotely to operate each stop. The solenoid for each of the stops has a tongue and a spring to urge the tongue into the lower opening to raise the ball of that opening so that the stop is normally engaged. When all the stops are engaged, the rotation is limited to the amount allowed by the stop having the smallest elongated opening. To provide increasingly greater amounts of rotation while torque is applied to the shaft, the stops are disengaged in the order from that having the smallest elongated hole to that having the largest elongated hole. Each stop is disengaged by operation of its solenoid to retract its tongue to permit its ball to fall all the way into its opening in the lower disk.

A controller for each actuator of a crane has a pair of contacts for each of the solenoids that control the stops. A timing circuit has an input in series with these contacts, and is effective when the flow through the valve control is to be decreased, to remove operating torque momentarily from the valve so that a spring can return the valve momentarily to its normal position. The operating torque is applied by a hydraulic actuator that is controlled by the timing circuit. In response to opening the circuit of a solenoid by operation of the controller in the direction to decrease flow, the fluid pressure is removed from the actuator by operation of valve controlled by the timer. After the stop is engaged, the timer functions to apply again pressure to the actuator, and the shaft of the rotary valve is rotated as much as the newly engaged stop permits.

DESCRIPTION OF THE PREFERRED EMBODIMENT

Figure 1:
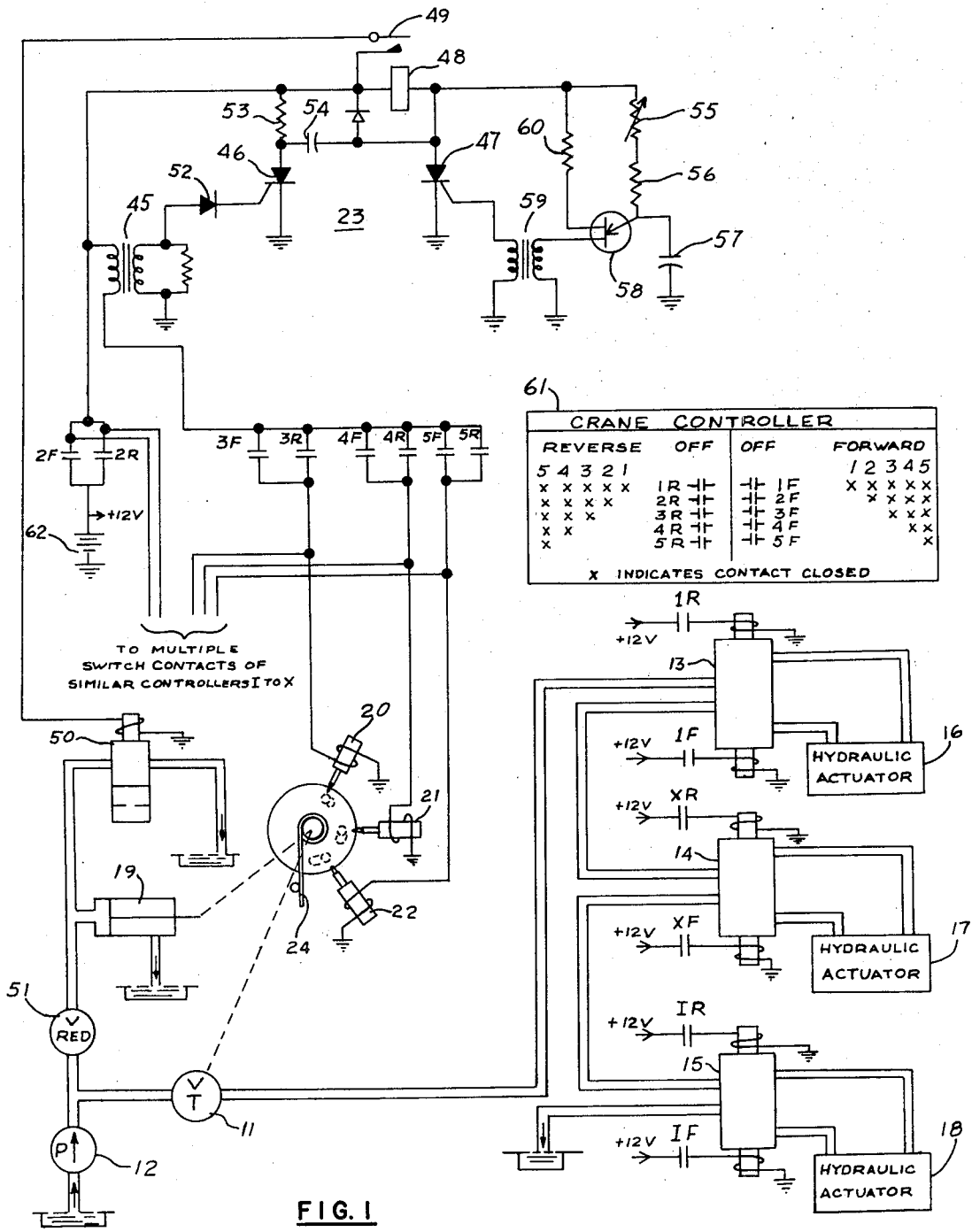
FIG. 1 is a schematic diagram of a hydraulic system showing the valve control device of this invention.
Figure 2:
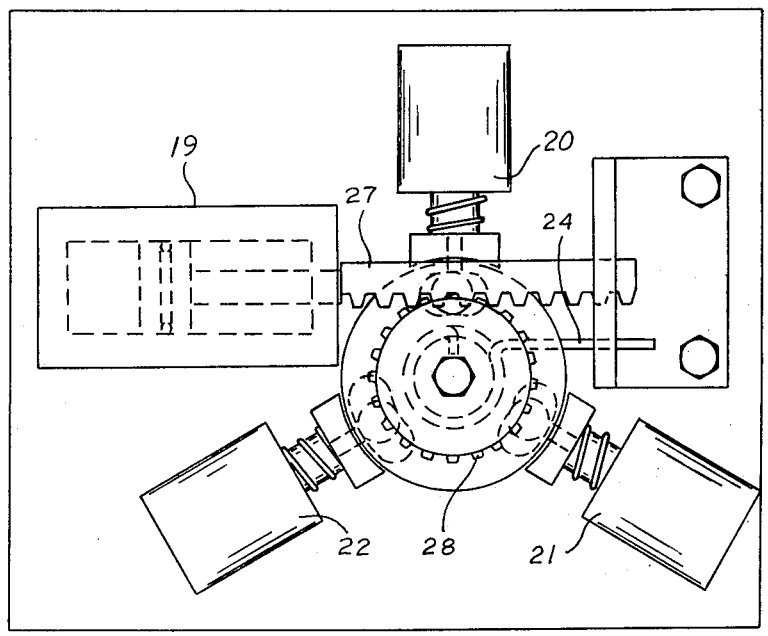
FIG. 2 is a top view of the valve of FIG. 1 showing an actuator and a plurality of stops.
Figure 3:
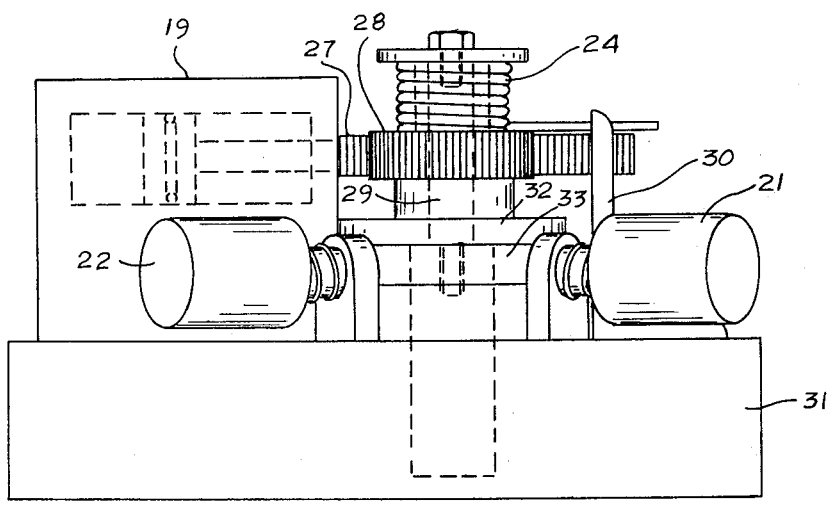
FIG. 3 is a side view of the actuator and the stops for the valve.

FIG. 1 shows schematically apparatus and electrical circuits for controlling a rotary throttle valve 11. A pump 12 for supplying high pressure is connected to the inlet of the valve 11, and directional valves 13–15 have their inlets connected in series to the outlet of the valve 11. In a typical system for controlling a crane, the directional valves 13–15 are controlled by individual remote controllers to supply fluid at high pressure to respective inlets of the hydraulic actuators 16-18. The directional valves 13–15 have a solenoid for each outlet and a contact on the respective controller has additional contacts for controlling the rotation of the shaft of the throttle valve 11. For example, for controlling the forward direction of an actuator 16, the crane controller 61 has in addition to the contact 1F for controlling the directional valve 13, the contacts 2F, 3F, 4F, and 5F, for controlling the rate of flow through the valve 11. Likewise for controlling the hydraulic actuator in an opposite direction, the crane controller 16 has in addition to the contact 1R, the contacts 2R, 3R, 4R, and 5R. As the controller 61 is advanced in the direction corresponding to the direction in which the hydraulic actuator 16 is to be operated, the contacts are closed in sequence and are maintained closed until the lever of the controller is operated in a reverse direction as shown for the controller 61. When the lever of the controller 61 is operated in the reverse direction, the contacts are open one at a time in a reverse order.

In addition to operating a selected directional valve 13–15, the controller 61 through its additional contacts operates a hydraulic actuator 19 coupled to the shaft of the valve 11 and operates solenoids 20–22 for controlling a stop mechanism connected to the shaft. Also, when the controller 61 is operated in the direction for decreasing the flow through the valve 11 and the circuit of any solenoid 20–22 is opened, the timing circuit 23 operates momentarily to remove the pressure from the actuator 19, and a spring 24 coupled to the shaft of the valve 11 rotates the valve in the direction for decreasing flow.

The operation of a system according to FIG. 1 will be more easily understood after referring to FIGS. 2–5 that show in detail a rack-and-pinion drive 25 and a stop assembly 26 for the valve 11. The rack-and-pinion assembly of FIG. 4 includes a rack 27 connected to the connecting rod of the actuator 19 and pinion 28 secured to the shaft 29 of the valve 11. A torsion spring 24 has its inner end connected to the shaft 29 and its outer end bearing against a bracket 30 (FIG. 3) that is fastened to the base 31 of the rotary valve assembly. The spring normally rotates the shaft 30 in the direction to provide minimum flow through the valve 11 and to push the rack 27 in the direction that pushes the piston rod of the actuator 19 into its cylinder.

A stop assembly 26 (FIG. 4) has a stop disk 32 secured to the shaft 29 of the valve 11 just below the pinion 28. A stop ball guide 33 is a disk mounted just below the disk 32, but it is secured to the base 31 of the valve assembly.

Figure 5:
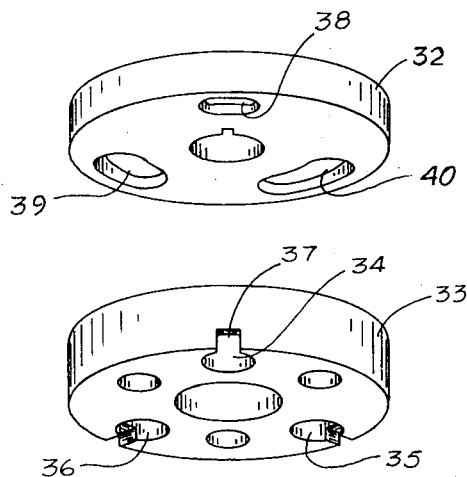
FIG. 5 is a detailed bottom oblique view of the stop disks shown in FIG. 4.

As shown in FIG. 5, the stop ball guide 33 has in addition to its mounting holes three equally spaced round holes 34–36 at equal distances from the center of the disk, and a slot 37 in the bottom of the disk extends diametrically from each of the holes to the edge of the disk 33. The stop disk 32 has in its bottom surface cavities 38–40 that are spaced to register with the holes 34–36 respectively of the stop ball guide 33. The cavities 38–40 have about the same diametral width as the diameter of the holes 34–36, and the depth of each of the cavities is equal to about one-half the diameter of the holes 34–36. However, the cavities 38–40 are elongated different amounts in the direction of their movement during rotation of the shaft 29 of the valve 11.

A ball 41 having a diameter slightly less than that of the openings 34–36 is placed in each one of these openings, and when the openings are unobstructed, the balls do not protrude into the cavities 38–40 of the disk 32. However, each ball is pressed upward about one-half its diameter by a respective tongue 42 projecting from the end of the plunger 43 of each of the solenoids 20–22. The solenoids 20–22 are equally spaced about the valve 11 so that their tongues 42 project into the respective slots 37. A compression spring 44 mounted about the plunger 43 of each of the solenoids 20–22 forces the plunger outwardly so that its tongue is normally across the lower portion of the respective opening 35–37. The end of the tongue 42 is beveled so that it will readily slide under a ball 41 and lift the ball except when the respective solenoid 20–22 is operated. When a ball is supported by the tongue 42, the respective stop is engaged and the shaft 29 of the valve 11 cannot be rotated a greater amount than that permitted by the engaged stop with the shortest elongated cavity 38–40.

Normally, the shaft 29 of the valve 11 is rotated to its minimum position by the spring 24, and the balls 41 are raised by their respective tongues 42 so that about one-half the ball extends into one end of its cavity 38–40 of the stop disk 32. In response to pressure being applied to the hydraulic actuator 19, the stop disk 32 is rotated over the balls 41 until it is stopped when a ball contacts the other end of the shortest cavity 38. Subsequently, when the solenoid 20 is operated to allow the ball 41 to fall into the respective opening 34 of the stop ball guide 33, the actuator 19 is effective to rotate the stop disk 32 until a ball 41 contacts the other end of the cavity 39 that is intermediate in length. In a like manner, the shaft 29 of the valve 11 can be rotated a greater amount when a ball protrudes only into the longest cavity 40. After the ball 41 for the cavity 40 is allowed to fall into the respective opening 36 of the stop ball guide 33, the shaft 29 of the valve 11 can be rotated until the valve is in its full on-position.

With reference to FIG. 1, whenever the timer 23 operates, pressure is removed from the actuator 19 and the spring 24 rotates the shaft of the valve 11 to its normal position for passing minimum flow. A sharp positive pulse or spike for starting the timing operation is provided by the secondary winding of a transformer 45. Assume that the crane controller 61 is operated fully in its forward direction to operate all of its contacts 1F through 5F, then a current path can be traced from ground through the source of voltage 62, the closed contact 2F, the primary winding of the transformer 45, and three parallel circuits comprising the contacts 3F, 4F, and 5F, and their respective windings of the solenoids 20, 21, and 22 to complete the circuit to ground. The timing circuit does not operate when the controller 61 is being operated in a forward direction to add additional windings of the solenoids 20, 21, and 22 to the circuit because the spikes that are produced at the secondary winding of the transformer 22 are negative, but when a circuit for any of the windings of the solenoids 20, 21, and 22 is opened, a positive spike is produced to operate the timer as described below.

The timing circuit 23 includes two SCR's (silicon controlled-rectifiers) 46 and 47; the SCR 46 is normally nonconductive, and the SCR 47 is normally conductive. A relay 48 is connected in the anode circuit of the SCR 47, and after a controller has been operated to close its second pair of contacts, a circuit for operating the relay can be traced from the positive terminal of a source of current 62 through closed, controller contact 2F, the winding of the relay 48, and through the conductive SCR 47 to ground. Operation of the relay 48 closes its contacts 49, and a circuit can be traced from the positive terminal of the source of voltage 62 through the contacts 49 and the operating winding of a solenoid valve 50.

While the solenoid valve 50 is operated, pressure is applied to the actuator 19 to apply rotary force to the shaft of the valve 11. In order to protect the stops of the valve 11 from damage, the pressure applied to the actuator 19 is generally reduced from that required to operate the actuators 16–18. Therefore, a restriction or a reducing valve 51 is connected between the conduit that supplies the fluid to the actuators of the crane and the inlet of the control actuator 19. A bypass circuit that prevents the operation of the actuator 19 extends from the inlet of the actuator 19 through the solenoid valve 50 to an exhaust conduit. The solenoid valve 50 is open to prevent the operation of the actuator 19 until the relay contacts 49 are operated to energize its winding.

In response to the application of a positive pulse from the secondary winding of the transformer 45, the SCR 46 becomes conductive and reduces the voltage on the anode of the SCR 47 sufficiently to cause it to become nonconductive. The secondary winding of the transformer 45 is connected through a diode 52 to the control gate of the SCR 46. The anode of the SCR 46 is connected through a resistor 53 and the contacts 2R to the source of voltage 62, and is also connected through a coupling capacitor 54 to the anode of the SCR 47. When the SCR 46 becomes conductive, a sharp decrease in voltage on its anode is applied through the capacitor 54 to the anode of the SCR 47 to cause it to become nonconductive.

An R-C timing circuit is also connected to the anode of the SCR 47, and because of the sharp increase of voltage at the anode when the SCR 47 becomes nonconductive, the capacitor of the timing circuit starts to charge. This circuit comprises an adjustable resistor 55, a resistor 56, and a capacitor 57 connected in series between the anode of the SCR 47 and ground. A circuit for firing the SCR 47 comprises a unijunction transistor 58 with N-type base and a transformer 59 connected between the capacitor 57 and the control electrode of the SCR 47. One connection to the base of the unijunction transistor 58 is completed through the resistor 60 to the anode of the SCR 47, and the other connection to the base is connected through the primary winding of the transformer 59 to ground. The emitter of the unijunction transistor 58 is connected to the junction point between the resistor 56 and the capacitor 57, and a predetermined interval after the SCR 47 becomes nonconductive, the voltage across the capacitor 57 rises until the transistor 58 rapidly changes state and causes a pulse of positive voltage to be applied to the control electrode of the SCR 47.

When the SCR 47 operates as a result of the operation of the unijunction transistor 58, the relay 48 is again operated to apply pressure to the control actuator 19. The SCR 46 turns on until the capacitor 54 is charged at which time current through the SCR 46 is below its holding current wherein it turns off.

Figure 4:
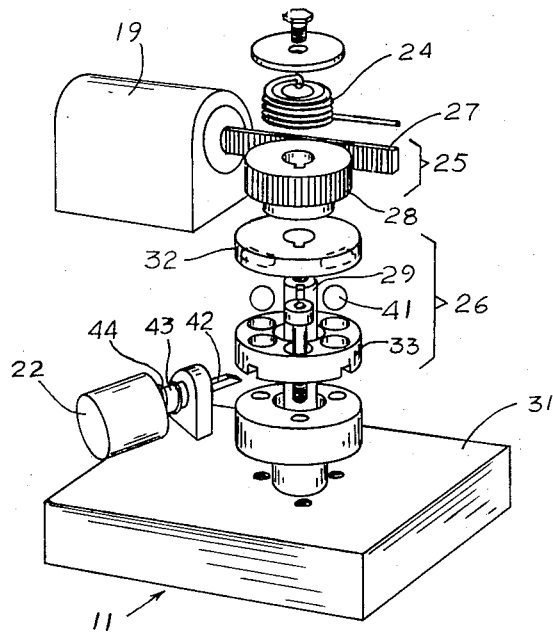
FIG. 4 is a fragmentary exploded view of the actuator and the stops of the valve.

Summarizing, an operator can control each motion of a crane smoothly. For example, the crane controller 61 can be operated gradually in a forward direction to increase the flow of fluid through a respective hydraulic actuator 16 at a controlled rate to prevent excessive oscillation. When the controller is operated to its first on-position, the contact 1F is closed to energize one of the windings of the directional valve 13. The valve operates to apply fluid freely from the throttle valve 11 to the inlet of the hydraulic actuator 16 that controls the desired forward motion. The shaft of the throttle valve 11 is maintained in its minimum position by the spring 24 to pass fluid at a predetermined minimum rate. When additional acceleration is desired, the controller is moved forward to its next position to close the contact 2F for applying voltage to the timing circuit 23. The SCR 47 fires to operate the relay 48 for energizing the solenoid valve 50. In response to the operation of the valve 50, the control actuator 19 rotates the shaft of the throttle valve 11 the amount that is allowed by the stop that is controlled by the solenoid 20. As the controller is advanced to its next position, the pair of contacts 3F is closed to operate the solenoid 20. The solenoid 20 withdraws the tongue 42 as shown in FIG. 4 to permit the respective stop ball 41 to fall into the opening 34 of the stop ball guide 33. The actuator 19 is now effective to rotate the shaft of the valve 11 an additional amount that is determined by the stop controlled by the solenoid 21. The change of current in the primary winding of the transformer 45 of the timing circuit 23 caused by closing a circuit to one of the solenoids is ineffective because it is the wrong polarity to fire the SCR 46. Likewise, as the controller is advanced still further, contacts 4F and 5F operate successively. When the contact 4F operates, the actuator 19 is effective to rotate the shaft of the valve 11 to the degree allowed by the stop that is opposite the solenoid 22. In response to the operation of the contact 5F, all of the controlled stops are disengaged, and the valve 11 is operated to its usual full on-position to operate the hydraulic actuator 16 at its highest speed.

When the lever of the crane controller 61 is returned slowly toward its off-position, the contact 5F is opened first to open the circuit of the solenoid 22. The change of current through the primary winding of the transformer 45 is now in that direction necessary to apply a positive pulse from a secondary winding to the control electrode of the SCR 46. The timing circuit 23 now functions as described above to open the bypass valve 50 momentarily to remove pressure from the inlet of the control actuator 19. The shaft of the rotary valve 11 is therefore rotated momentarily to its normal position by the spring 24. During this interval, the plunger of the solenoid 22 has been forced outwardly by its respective spring 44 to engage its stop and thereby to limit rotation of the shaft as it is again rotated by the force of the control actuator 19. In a like manner, the stops controlled by the solenoids 21 and 20 are engaged in sequence. Next, the contact 2F is opened to remove the force applied by the control actuator 19 so that the shaft of the rotary valve 11 is returned to its normal position for a minimum rate of flow through the actuator 16. As the controller 16 is operated to its off-position, the contact 1F is opened to stop the flow to the actuator 16. Obviously, the rate of acceleration and deceleration of the crane in its different directions can be controlled by the rate at which the levers of the controllers are moved through their positions.

Preferably, the controllers are connected to the control system by easily removable connectors so that they may be changed to different location. Those contacts of all the controllers that control the stops are connected in parallel. The contacts at any one location for the different directional valves 16–18 are connected to their individual circuits, but contacts in different locations for controlling the same motion may be in parallel.

Although a rotary stop assembly has been described herein above it is not intended to limit the invention thereto. A linear system, rack and pinions for example, could be substituted therefore. Furthermore the directional valves can readily be connected in parallel with the use of additional valving wherein the proper flow of fluid to any preselected valve can be obtained.

I claim:

1. In a hydraulic system having a pressure compensated flow control valve with an inlet and an outlet, means for applying fluid at high pressure to said inlet, an actuator, and means for applying fluid from said outlet to said actuator;

valve-control means for controlling said valve to determine the rate of flow therethrough comprising:

spring means operably connected to the shaft of said valve to urge the shaft to move to a normal position where the valve passes fluid at a predetermined minimum rate;

a stop assembly operably secured to said shaft, said stop assembly having a plurality of stops, each of said stops normally being engaged, each stop while engaged limiting the movement of said shaft to a different predetermined amount so that the amount of movement of said shaft is limited to that provided by an engaged stop that allows a smaller amount of movement than any other engaged stop;

stop-control means operable for disengaging said stops in order from that allowing the least amount of movement to that allowing the greatest amount of movement of said shaft and also operable for returning said stops to their normal engaged position in a reverse order; and a control actuator coupled to said shaft of said valve, shaft-control means connected to said actuator, said shaft-control means being operable to an on-position and back to an off-position, said actuator in response to said shaft-control means being operated to its on-position applying force to said shaft to move it in opposition to the force of said spring means in a direction from said normal position until its movement is stopped by the effective one of said stops, and in response to said shaft-control means being operated to its off-position removing force to allow said spring means to move said shaft to said normal position.

2. In a hydraulic system having valve-control means according to claim 1 wherein said stop assembly comprises:

upper and lower disks, each of said disks having for each of said stops an opening arranged on a concentric circle, said upper disk being secured coaxially to said shaft, said lower disk being mounted coaxially and firmly immediately below said first disk, said openings in one of said disks registering opposite the respective one of said openings in the other of said disks, at least one of said openings for each of said stops being elongated in the direction of said concentric circle, the total amount of elongation with respect to width of oppositely registered pair of openings differing to provide different amounts of movement of said shaft;

a stop ball positioned in each of said openings of said lower disk, said stops being disengaged while said balls are substantially contained within the respective openings of only said lower disk;

said stop-control means including a tongue for each of said openings of said lower disk, means normally effective to insert said tongues within their respective openings to lift said balls until a substantial portion of each ball enters a respective opening of said upper disk, thereby to engage said stops, and means operable for retracting said tongues in sequence to disengage said stops in the order described above, and also operable to return said stops to their normal engaged position in a reverse order.

3. In a hydraulic system having valve-control means according to claim 2 wherein said means for inserting said tongues to lift said balls include:

a solenoid for each of said stops, each of said solenoids having a plunger to which a respective one of said tongues is attached, spring means contacting each of said plungers to urge the respective one of said tongues into its opening to engage the respective stop; and electrical switching means connected to said solenoids operable to successive, on-positions to energize said solenoids for retracting said tongues to disengage said stops, in the order described above, and also operable toward an off-position to deenergize said solenoids in a reverse order for returning said stops to their normal engaged position.

4. In a hydraulic system having valve-control means according to claim 3 wherein said control actuator is a hydraulic actuator of the single acting type, coupling means connected between said control actuator and said shaft of said valve to convert reciprocating motion into rotary motion.

5. In a hydraulic system having valve-control means according to claim 4 wherein said coupling means comprises a rack connected to said hydraulic actuator and a pinion mounted on said shaft.

6. In a hydraulic system having valve-control means according to claim 4 wherein said shaft-control means includes a hydraulic control valve with a solenoid, said hydraulic control valve being connected to said control actuator to control the flow of fluid thereto, electrical valve-control means connected to said last-mentioned solenoid and to said electrical switching means, said electrical valve-control means operating in response to said switching means being operated to an on-position to operate said hydraulic control valve and thereby to cause said control actuator to urge said shaft in a direction of movement away from its normal position, and said electrical valve-control means momentarily releasing in response to said switching means being operated to return any of said stops to its normal engaged position to interrupt the force applied by said control actuator to allow said shaft of said rotary valve to return momentarily to its normal position before the movement of said shaft by said control actuator is limited by said stop that is last returned to its normal position.

7. In a hydraulic system having valve-control means according to claim 1 wherein said stop-control means includes a solenoid for each of said stops, each of said solenoids having a plunger positioned to actuate the respective one of said stops, spring means urging each of said plungers in a position to engage the respective stop, a source of current, switching means connected to said source of current and having a contact connected to each of said solenoids, said switching means having a normal off-position, said switching means operable in an on-direction to complete a circuit from said source of current to said solenoids in said order in which the respective ones of said stops are to be engaged, said solenoids operating in response to completion of its circuit to said source of current to disengage a respective one of said stops, and said switching means operable toward its off-position to open the circuit from said source of current to said solenoids in a reverse order to return said stops to a normal engaged position.

8. In a hydraulic system having valve-control means according to claim 7 wherein said shaft-control includes a switch operable between its on-position and its off-position, said switch normally being in its on-position, a solenoid winding associated with said control actuator, said switch being connected to said source of current and to said solenoid winding, said solenoid winding being energized in response to operation of said switch to its on-position to operate said actuator for moving said shaft in a direction from said normal position and being deenergized in response to said switch being operated to its off-position to allow movement of said shaft in a direction toward its normal position;

timing means connected between said switch and said switching means, said timing means controlling the operation of said switch, said timing means operating in response to opening the circuit from said source of current to any of said solenoids as a result of operation of said switching means in its off-direction to operate said switch to its off-position, and simultaneously to start a timing interval, said shaft being moved by said spring means to its normal position in response to said switch being operated to its off-position, and said timing means operating at the end of said timing interval to operate again said switch to its on-position for moving said shaft off its normal position to an effective one of said stops.

9. In a hydraulic system having valve-control means according to claim 8 wherein said stop assembly comprises:

upper and lower disks, each of said disks having for each of said stops an opening arranged on a concentric circle, said upper disk being secured coaxially to said shaft, said lower disk being fixed coaxially immediately below said first disk, said openings in one of said disks registering opposite the respective one of said openings in the other of said disks, at least one of said openings for each of said stops being elongated in the direction of said concentric circle, the total amount of elongation of oppositely registered pair of openings differing to provide different amounts of movement of said shaft;

a stop ball positioned in each of said openings of said lower disk, said stops being disengaged while said balls are substantially contained within the respective openings of only said lower disk;

said stop-control means including a tongue projecting from the outer end of each of said plungers of said solenoids, said spring means normally being effective to insert said tongues within their respective openings of said lower disk to lift said balls until a substantial portion of each ball enters a respective opening of said upper disk, thereby to engage said stops, and operation of any one of said solenoids retracting the respective one of said tongues to engage the respective one of said stops.

10. In a hydraulic system having valve-control means according to claim 8 wherein said timing means includes a SCR, a relay, said switch being a pair of normally-open contacts on said relay, said relay having a winding connected in the anode cathode circuit of said SCR; said SCR normally being conductive to operate said relay, a transformer having a primary winding and a secondary winding, said primary winding connected in series with said switching means and said source, firing-control means connected between said secondary winding and said SCR to turn off said SCR in response to a sharp decrease of current through said primary winding as a result of operating said switching means to open the circuit of any one of said solenoids connected thereto, a triggering circuit, a capacitive timing circuit connected to said triggering circuit and to said anode-cathode circuit of said SCR, said triggering circuit also being connected to the control circuit of said SCR, said timing circuit responding to the turning off of said SCR to operate said triggering circuit after a predetermined interval, thereby to again fire said SCR and to operate said relay and said control actuator.

11. In a hydraulic system having valve-control means according to claim 10 wherein there is a plurality of actuators, and said means for applying fluid from said outlet to said actuator include a directional solenoid valve connected between said outlet and each of said actuators, each directional solenoid valve having a valve-control winding for each direction of action of the respective one of said actuators;

said switching means including a controller for each of said actuators, each of said controllers having a plurality of normally open contacts, a certain corresponding one of said normally-open contacts of each of said controllers being connected to a respective one of said solenoids for controlling a respective stop, the corresponding contacts for controlling said solenoids being connected in parallel, and a different contact of each of said controllers being connected to each of said valve-control windings of the respective one of said directional solenoid valves, and operation of any one of said controllers to any of its on-positions for controlling said solenoids of said stops closing said contacts connected to a respective one of said valve-control windings to operate a respective one of said actuators.

* * * * *